(12) United States Patent
Nabeshima (10) Patent No.: US 11,172,252 B2
(45) Date of Patent: Nov. 9, 2021

(54) CONTENT PLAYBACK DEVICE AND PROGRAM

(71) Applicant: J-Stream Inc., Tokyo (JP)

(72) Inventor: Masaaki Nabeshima, Tokyo (JP)

(73) Assignee: J-Stream Inc., Tokyo (JP)

( * ) Notice: Subject to any disclaimer, the term of this patent is extended or adjusted under 35 U.S.C. 154(b) by 0 days.

(21) Appl. No.: 16/509,364

(22) Filed: Jul. 11, 2019

(65) Prior Publication Data

US 2019/0335234 A1    Oct. 31, 2019

Related U.S. Application Data

(63) Continuation of application No. PCT/JP2019/006467, filed on Feb. 21, 2019.

(30) Foreign Application Priority Data

Mar. 20, 2018  (JP) .............................. JP2018-052910

(51) Int. Cl.
    *H04N 21/442*    (2011.01)
    *H04N 21/4143*   (2011.01)
    *H04N 21/462*    (2011.01)

(52) U.S. Cl.
    CPC ... *H04N 21/44209* (2013.01); *H04N 21/4143* (2013.01); *H04N 21/4622* (2013.01)

(58) Field of Classification Search
    CPC ......... H04N 21/44209; H04N 21/4143; H04N 21/4622
    See application file for complete search history.

(56) References Cited

U.S. PATENT DOCUMENTS

| 9,461,903 B2 | 10/2016 | Kojima | |
| 10,326,810 B2* | 6/2019 | Park | H04N 21/47202 |
| 2002/0107968 A1* | 8/2002 | Horn | H04N 21/8456 709/230 |
| 2006/0174160 A1* | 8/2006 | Kim | H04L 65/80 709/231 |
| 2012/0170523 A1* | 7/2012 | Civanlar | H04N 21/234327 370/329 |
| 2012/0311174 A1* | 12/2012 | Bichot | H04N 21/44209 709/231 |

(Continued)

FOREIGN PATENT DOCUMENTS

JP    2014-183563 A    9/2014

*Primary Examiner* — Randy A Flynn
(74) *Attorney, Agent, or Firm* — Studebaker & Brackett PC (57) ABSTRACT

The playback device 2 receives fragment data of content via the network 4 to play back the content on the basis of the fragment data. The playback device 2 alternately connects the servers 3 distributing the content and receives the acquisition number of the fragment data continuing in the content from each server 3. The player 16 measures the network characteristics when the fragment data is distributed from the server 3 to the playback device 2. The player 16 compares the respective network characteristics of the servers 3, selects the server 3 with the best network characteristic as the high priority server 3, decides the server 3 other than the high priority server 3 as the low priority server 3, and increases the second acquisition number from the high priority server 3 above the third acquisition number from the low priority server 3.

3 Claims, 3 Drawing Sheets

(56) References Cited

U.S. PATENT DOCUMENTS

2013/0166768 A1\* 6/2013 Gouache ............ H04N 21/6373
                              709/231
2014/0143431 A1\* 5/2014 Watson .................. H04L 65/80
                              709/227
2017/0188059 A1\* 6/2017 Major ................ H04N 21/8456

\* cited by examiner

CONTENT PLAYBACK DEVICE AND PROGRAM

TECHNICAL FIELD

The present invention relates to a playback device for receiving fragment data of content from distribution sources, such as servers, to play back content and a program for making a computer function as this playback device.

BACKGROUND ART

Conventionally, content, such as a movie, is distributed to a playback device of a user by using a CDN (Content Delivery Network). In the CDN, the same contents are stored in a plurality of servers. When the playback device transmits a request of content distribution to a center server, the center server distributes the content from one server out of the plurality of servers to the playback device. It is preferable that selection of the server as an optimal distribution source is carried out by measurement of throughput between each user and a plurality of distribution servers in an application for the movie or the like with large band consumption. However, this needs much processing power and processing time. Therefore, in the actual CDN, it is carried out on the basis of aggregation data of regular measurement of response time between an ISP and the plurality of servers.

Further, in content distribution, use of a so-called multi-CDN is promoted so that, in addition to the above-mentioned CDN of selecting any one of the plurality of servers as the distribution source, any one of a plurality of CDNs is selected as a distribution source. In such a case, selection of the server as the optimal distribution source is carried out by aggregated data of regular measurement of response or throughput between each user and each server and by carrying out measurement of response just before selection of the CDN.

As an example, a communicating device disclosed in Patent Document 1 includes a content server selecting section and a content transferring section; the content server selecting section for acquiring content from a first or second content server capable of distributing the same content, for estimating a route pattern providing the highest throughput out of a route pattern identified by one or more routes simultaneously used from the communicating device to the first content server and a route pattern identified by one or more routes simultaneously used from the communicating device to the second content server, and for selecting the first or second content server connected with the communicating device by the estimated route pattern; the content transferring section for acquiring the content by using the selected route pattern, and for transmitting the acquired content to a terminal device.

PRIOR ART DOCUMENT

Patent Document

[PATENT DOCUMENT 1] Japanese unexamined patent application publication No. 2014-183563

SUMMARY OF INVENTION

Problems to be Solved by the Invention

As mentioned above, if preparation communication is established and traffic is measured and aggregated with respect to all of the plurality of servers and the plurality of CDNs as candidates for the distribution source of the content, processing load and processing time of the center server are increased. Moreover, when the preparation communication is carried out, useless traffic used for only selection of the distribution source is increased, and then, it is feared that network is congested and communication speed is decreased. Further, because measurement and aggregation of each traffic are carried out in the center server, it takes a lot of time to identify the distribution source in a playback device and real-time property of content playback is decreased. In addition, although communication environment of the playback device may be suddenly changed in accordance with user's condition, because the center server cannot immediately detect the communication environment of the playback device, it takes a lot of time to decide whether or not reselection of the distribution source is required.

Thereupon, an object of the present invention is, under consideration of the above-mentioned circumstances, to select an optimal distribution source for content while improving real-time property without causing useless traffic.

Means for Solving the Problem

In order to solve the above-mentioned problems, a first playback device of the present invention is a playback device for receiving fragment data of content via a predetermined network to play back the content on the basis of the fragment data, in which the playback device alternately connects a plurality of distribution sources distributing the content and receives a predetermined acquisition number of the fragment data continuing in the content from each distribution source, the playback device measures network characteristics when the fragment data is distributed from the distribution source to the playback device, and the playback device compares respective network characteristics of the plurality of distribution sources, selects the distribution source with a best network characteristic as the high priority distribution source, decides the distribution source other than the high priority distribution source as a low priority distribution source, and increases an acquisition number from the high priority distribution source above an acquisition number from the low priority distribution source.

Moreover, in order to solve the above-mentioned problems, in the above-described first playback device of the present invention, a second playback device of the present invention sets a predetermined magnification of the number of the plurality of distribution sources to a decision unit being the number of the fragment data used for deciding the high priority distribution source, the playback device sets a common first acquisition number calculated by dividing the decision unit by the number of the plurality of distribution sources to the acquisition number of the fragment data to be received while being connected to each of the plurality of distribution sources at first time after playback of the content is started, and when the high priority distribution source is selected on the basis of measurement result of the network characteristics, the playback device sets the acquisition number of the fragment data from the high priority distribution source to a second acquisition number more than the first acquisition number and sets the acquisition number of the fragment data from the low priority distribution source to a third second acquisition number calculated by subtracting the second acquisition number from the decision unit.

Further, in order to solve the above-mentioned problems, in the above-described first or second playback device of the present invention, a third playback device of the present invention calculates an averaged throughput of respective distribution of the acquisition number of the fragment data as the network characteristic.

In accordance with the above-described playback devices of the present invention, since the playback device measures the network characteristics about the traffic between the playback device and each distribution source, it is possible to reduce a load of a center server managing the content. Moreover, since the playback device measures the network characteristics about the traffic in distribution of the content, it is unnecessary to establish communication only for selection of the optimal distribution source (measurement of the network characteristics), and it is possible to reduce wasteful traffic, to restrain congestion of the network and to restrain decreasing of communication speed. Further, since the playback device makes not only the high priority distribution source decided the good network characteristic, but also the other low priority distribution source, distribute the fragment data of the content, the playback device always decides the respective network characteristics of the plurality of distribution sources. Therefore, since the playback device immediately selects the optimal high priority distribution source and gives the high priority distribution source priority for distribution of the fragment data, it is possible to restrain decreasing of communication speed. For example, when the user having the playback device is moved, because a base station communicating to the playback device is changed and a communication route to the distribution source is changed, it is expected that the network characteristics are suddenly changed. However, since the playback device of the embodiment always decides the network characteristic of each distribution source and immediately selects the optimal high priority distribution source, it is possible to make the moving user comfortably use the playback device without feeling changing of the network characteristics (decreasing of the communication speed and others).

Moreover, a computer readable medium of the present invention stores a program making a computer function as any one of the above-described first to third playback devices.

Effects of the Invention

In accordance with the present invention, it is possible to select an optimal distribution source for content while improving real-time property without causing useless traffic.

EMBODIMENTS FOR CARRYING OUT THE INVENTION

Figure 1:
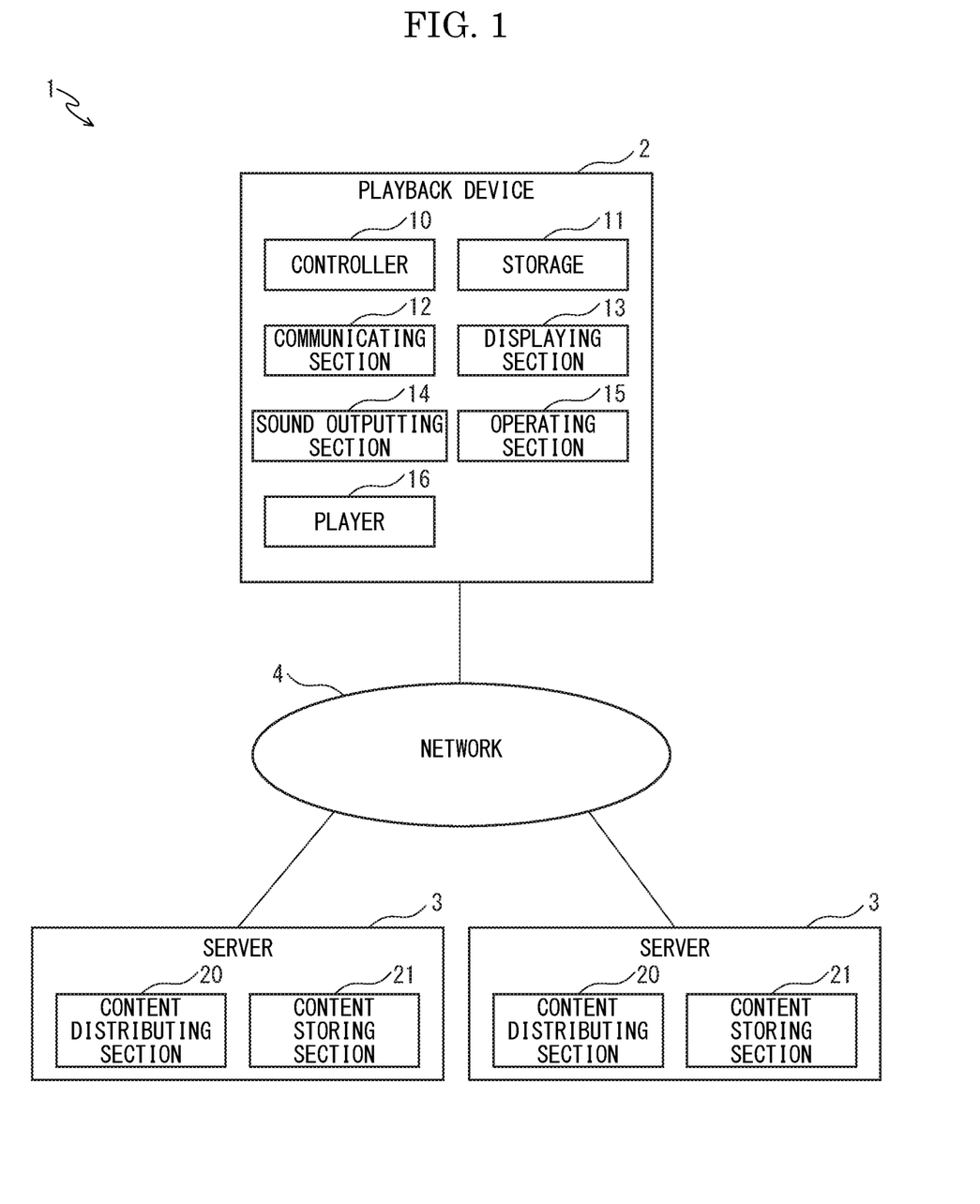
FIG. 1 It is a block diagram schematically showing a content distributing system including a playback device in accordance with an embodiment of the present invention.

The structure of a content distributing system 1 (hereinafter, called as a distributing system) including a playback device 2 according to an embodiment of the present invention will be described with reference to the drawings. The distributing system 1 includes, as shown in FIG. 1, the playback device 2 and a plurality of servers 3 (distribution sources), and is configured to distribute content from the server 3 to the playback device 2 via a predetermined network, such as an internet. Incidentally, although FIG. 1 illustrates an example of the distributing system 1 including one playback device 2 and two servers 3, the distributing system 1 may include two or more playback device 2 and three or more servers 3. Incidentally, the distributing system 1 is provided with a center server (not shown) as a navigation server carrying out content management and request control, other than the plurality of servers 3.

The content distributed in the distributing system 1 is composed of a plurality of fragment data (segments) into which video, music or the like is fragmented (subdivided) in time series order, and each fragment data is distributed by streaming or progressive download. To the content, a metafile describing the semantic meanings of its content is added. In the metafile, for example, meta information including content information of a title, a thumbnail, a length (total playback time) and others of the content; fragment data information of a format, a length (time), link information (URL), playback order and others of the fragment data; and others is described. Alternatively, the meta information is extractably stored in a media file of the content.

The playback device 2 is a content playback device receiving the content from the server 3 and outputting playback signal, such as video signal or music signal, of the content to play back. The playback device 2 may be a device capable of being connected with the server via the network 4 and capable of playing back the content, e.g. a smart phone, a tablet terminal, a personal computer (including a notebook type personal computer) or other computers.

The playback device 2 includes, for example, a controller 10, a storage 11, a communicating section 12, a displaying section 13, a sound outputting section 14 and an operating section 15. Moreover, the playback device 2 includes a player 16 for playing back the content, and the player 16 is composed of an application stored in the storage 11 and controlled by the controller 10 to be operated.

The controller 10 has a CPU (Central Processing Unit) and others, and is configured to integrally control the whole operation of the playback device 2. The storage 11 has a memory, such as a ROM (Read Only Memory) and a RAM (Random Access Memory), and a recording medium, such as a hard disk, and is configured to store information, data program and others controlled by the controller 10.

The communicating section 12 is an interface for connecting the playback device 2 with the network 4, such as an internet or a LAN, that is, connects the playback device 2 with the server 3 via the network 4. The communicating section 12 communicably connects with an external device, such as the server 3, via the network 4 by a communicating manner selected out of various network environments (communicating manners) of a mobile network (a carrier network), such as 3G and LTE, a Wi-fi network and others. Incidentally, the communicating section 12 may automatically select an optimal communicating manner or may select the communicating manner in accordance with operation of a user.

The displaying section 12 is a display capable of displaying video and image, and may be composed of any display device, such as a liquid crystal, an organic electroluminescent (organic EL) or a light emitting diode (LED), and may have a touch panel function. The sound outputting section 14 is composed of a speaker or a headphone terminal capable of outputting sound. The operating section 15 is composed of an inputting device, such as a keyboard, a pointing device and other keys, receiving input operation of the user, and may be constituted integrally with the displaying section 13 when the displaying section 13 is composed of a touch panel.

Figure 2:
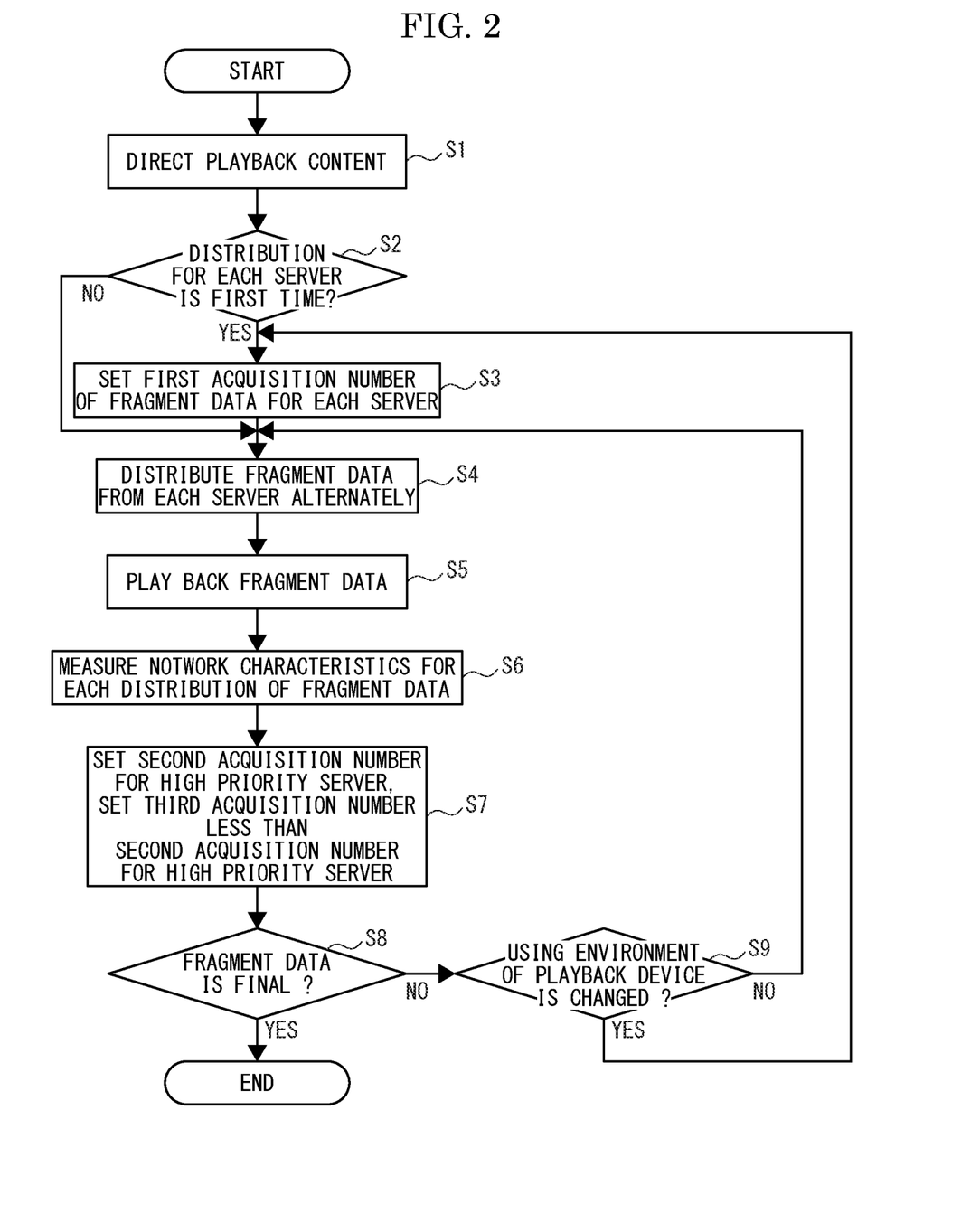
FIG. 2 It is a flow chart showing content playback operation in the playback device in accordance with the embodiment of the present invention.

The player 16 is configured to receive the content (fragment data) to be played back from the server 3, to play back video signal or music signal of the content (fragment data) and to output the signal by the displaying section 13 or the sound outputting section 14. In other words, the player is an application (program) installed in the playback device 2 to make a computer, such as the controller 10, function as the playback device 2. FIG. 2 illustrates a flow chart of content playback operation of the player 16 in the playback device 2. For instance, the player 16 is a content player, such as a video player, and may be an application independently running in the playback device 2 or may be an application running in a state integrated in a browser. For example, the player 16 transmits distribution request indicating the fragment data to be played back by identification information (e.g. serial number in time series order or the like) to the server 3 and receives the fragment data distributed in accordance with the distribution request by the server 3.

The player 16 displays various screens allowing operation of the user on the displaying section 13, for instance, displays a playback screen (not shown) for displaying video or image on the basis of video signal of the content. The player 16 may receive operation input, such as playback start, fast forwarding, rewinding, temporary stop, playback restart, stop and others of the content. On the playback screen, for example, in addition to a content display window, a playback button for operating playback and temporary stop of the content, a fast forwarding button and a rewinding button or a seek bar for changing a playback position of the content, a stop button and others are operatably displayed. Moreover, the playback screen may have a playback time indication for displaying playback time of the content and a sound volume changing button for changing output sound volume of the content. Incidentally, the playback screen allows customizing of each window or each button in accordance with convenience of the user.

The player 16 stores preset identification information (e.g. hostname) of the plurality of servers 3 as distribution source candidates of the content. The identification information of the distribution source candidates may be directly inputted by the user operating the playback device 2, or may be directed by the center server managing the content. Incidentally, the plurality of servers 3 as the distribution source candidates may be determined for each center server. The player 16 can communicably connect with the server 3 by utilizing the identification information.

The player 16 presents the contents as playback candidates to the user in order to direct the content to be played back (step S1), for instance, displays a list screen (not shown) listed the contents as the playback candidates. The player 16 may search the playback candidates on the basis of keyword or category inputted from the user by utilizing a searching engine on the network 4, or may be set the contents recommended by the center server as the playback candidates. In searching and recommending of the content, link information (URL) of the content is also presented, and in the list, the link information is added for each content. The list screen is, in other words, a content selecting screen for selecting the content to be played back in the playback device 2, and in the player 16, the content to be played back is directed by selecting operation of the content on the list screen by the user.

Moreover, the player 16, when presenting the content as the playback candidate, connects with any one of the plurality of servers 3 as the distribution source candidates to acquire the meta information of the content on the basis of the link information of the content. The player 16 extracts the meta information (the content information, such as the title, the thumbnail and the length, of the content, the fragment data information, such as the format, the length, the link information and the playback order, of the fragment data and others) from the media file or the meta file of the content acquired on the basis of the link information. For example, the content information may be displayed on the list screen. Incidentally, as an acquisition source of the meta information, the server 3 set in advance, the server 3 with the shortest communication route or the center server may be selected.

Further, in the player 16, regardless the above-described list screen, the content to be played back may be directed by the link information of the content directly inputted by the user operating the playback device 2. In such a case, the player 16 connects with any one of the servers 3, acquires the meta information of the content on the basis of the link information of the content, extracts the content information or the fragment data information and displays the content information.

The player 16, when the content to be played back is directed, alternately connects the plurality of servers 3 as the distribution source candidates, makes the servers 3 distribute the fragment data of the content so as not to overlap, and receives the data, for instance, can prevent overlapping by directing the identification information of the fragment data to be distributed from each server 3. Order of the plurality of servers 3 alternately connected by the player 16 may be set in advance by the center server or may be set by being selected in advance by the user. Incidentally, the player 16, while one connection to each server 3 is established, makes the server 3 distribute a predetermined acquisition number of the continuing fragment data. Here, one connection of the player 16 to the server 3 indicates connection in a period when the predetermined acquisition number of the fragment data is continuously acquired, and may not be strictly continuous connection. Subsequently, the player 16 plays back the received fragment data in time series order. Incidentally, playback of the fragment data is time series order, but distribution of the fragment data is not limited by time series order.

Moreover, the player 16 measures a network characteristic (throughput, latency) with respect to traffic of each server 3 when each server 3 distributes the fragment data to the playback device 2, and feedback controls so as to change the acquisition number of the fragment data for each connection to each server 3 in accordance with measurement result. Incidentally, the player 16 compares network characteristics of the plurality of servers 3 to select the server 3 with a best network characteristic as a high priority server 3 (a high priority distribution source) utilized with priority in content distribution and to decide the server 3 other than the high priority server 3 as a low priority server 3 (a low priority distribution source).

Hereinafter, it will be described about a concrete example of the above-described feedback control. First, the player 16 sets a predetermined magnification (e.g. 10) by multiplying the number (e.g. 2) of the plurality of servers 3 by a predetermined multiplier (e.g. 5) to a decision unit being the number of the fragment data used for deciding the high priority server 3. For instance, in a case where the length of the fragment data is one second and the decision unit is 10, a length (time) of the decision unit is 10 seconds.

In initial operation (step S2: YES) starting playback of the content, the player 16 sets a result of dividing the above-described decision unit (e.g. 10) by the number (e.g. 2) of the plurality of servers 3 to a common first acquisition number (e.g. 5) as the acquisition number of the fragment data to be received while being connected to each of the plurality of servers 3 at first time (step S3). That is, the common first acquisition number is equal to the above-described predetermined multiplier. Subsequently, the player 16 alternately connects the plurality of servers 3, and makes the servers 3 sequentially distribute the first acquisition number of the fragment data by directing the link information and the identification information of the fragment data information on the basis of the fragment data information of the meta information and receives the fragment data (step S4).

Figure 3:
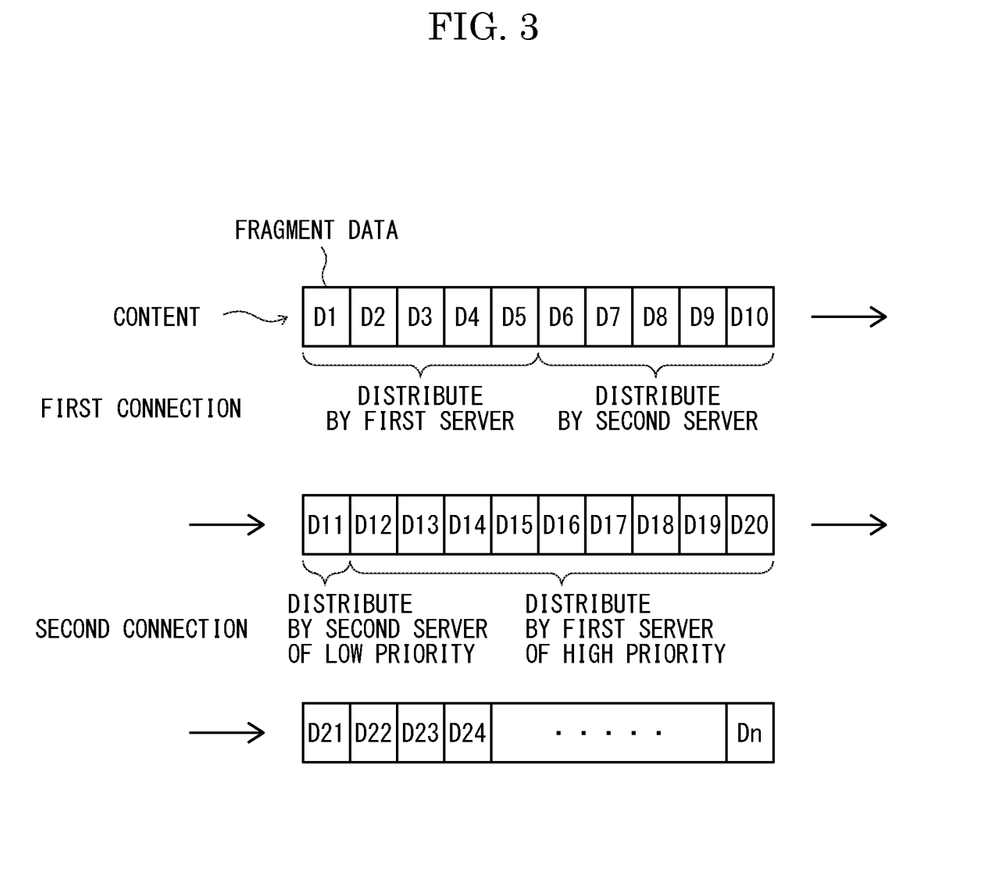
FIG. 3 It is a schematic diagram showing content distribution operation in the playback device in accordance with the embodiment of the present invention.

For instance, in a case where the first acquisition number set in each server 3 is 5, as shown in FIG. 3, when the player 16 connects to a first server 3a and a second server 3b in this order and makes the servers 3 distribute the content composed of the fragment data D1-Dn (n is an integer) continuing in time series order, the player 16 firstly directs the first to fifth fragment data D1-D5 to make the first server 3a distribute the fragment data, and next directs the sixth to tenth fragment data D6-D10 to make the second server 3b distribute the fragment data. Subsequently, the player 16 receives the fragment data D1-D5 from the first server 3a, receives the fragment data D6-D10 from the second server 3b, and plays back the fragment data D1-D10 sequentially (step S5).

Moreover, the player 16 measures the network characteristic (throughput, latency) for each fragment data with respect to traffic of each server 3 when the server 3 distributes the fragment data to the playback device 2 (step S6), and selects the high priority server 3 with the best network characteristic on the basis of the measurement result. For instance, the player 16 measures throughput for each distribution of each fragment data of each server 3 as the network characteristic, calculates an average value of the throughput (an averaged throughput), selects the server 3 with the highest averaged throughput as the high priority server 3, and decides the other server 3 as the low priority server 3. Incidentally, in the initial operation, the player 16 calculates the average value of the first acquisition number of the throughput equal to the number of the distributed fragment data.

When the player 16 selects the high priority server 3, the player 16 changes the acquisition number (the second acquisition number) of the fragment data from the high priority server 3 by increasing the second acquisition number more than the acquisition number (the third acquisition number) of the fragment data from the low priority server 3 (step S7). At this time, the second acquisition number and the third acquisition number may be set so that the total number becomes the above-described decision unit. For instance, in a case where the total number of the fragment data is 10, the player 16 sets the second acquisition number with respect to the high priority server 3 to 9 and sets the third acquisition number with respect to the low priority server 3 to 1. Incidentally, the player 16 may set, on the basis of a rate of the averaged throughput of the high priority server 3 and the averaged throughput of the low priority server 3, so as to increase the second acquisition number as the averaged throughput of the high priority server 3 is increased. Moreover, playback of the fragment data (step S5), measurement of the network characteristics (step S6) and setting of the second acquisition number and the third acquisition number may be executed in parallel.

Subsequently, if there is the next fragment data to be played back (step S8: NO), the player 16 connects to the plurality of servers 3 for the second time and thereafter (step S2: NO). The player 16 sets the second acquisition number and the third acquisition number changed as described above as the acquisition number of the fragment data to be received in second connection to the plurality of servers 3. Subsequently, the player 16 alternately connects the plurality of servers 3, makes the high priority server 3 distribute the second acquisition number of the fragment data, and makes the low priority server 3 distribute the third acquisition number of the fragment data. In the embodiment, at this time, the player 16 connects the low priority server 3 and the high priority server 3 in this order, but may connect the high priority server 3 and the low priority server 3 in this order.

For instance, in a case where the second acquisition number set to the first server 3a of the high priority server 3 is 9 and the third acquisition number set to the second server 3b of the low priority server 3 is 1, as shown in FIG. 3, when the player 16 connects the low priority server 3 and the high priority server 3 in this order and receives the content composed of the fragment data D11-Dn continuing in time series order, the player 16 first makes the second server 3b distribute the eleventh fragment data D11, and next makes the first server 3a distribute the twelfth-twentieth fragment data D12-D20. Subsequently, the player 16 receives the eleventh fragment data D11 from the second server 3b, and receives the twelfth-twentieth fragment data D12-D20 from the first server 3a, and then, plays back the fragment data D11-D20 sequentially (step S5).

Moreover, similar to the above-described initial operation, the player 16 measures the network characteristic for each fragment data when each server 3 distributes the fragment data in second connection to the playback device 2 (step S2), for example, measures the throughput in distribution of each fragment data and calculates the averaged throughput. For instance, the player 16 calculates the averaged throughput of the second server 3b decided as low priority in the last (first) connection on the basis of two recent throughputs (throughputs in distribution of the tenth fragment data D10 and the eleventh fragment data D11). In addition, the player 16 calculates the averaged throughput of the first server 3a decided as high priority in the last connection on the basis of nine recent throughputs (throughputs in distribution of the twelfth-twentieth fragment data D12-D20). Subsequently, the player 16 decides the high priority server 3 and the low priority server 3 again on the basis of the measurement result of the network characteristics in the second connection of the playback device 2 to the servers 3, and selects the server 3 (the high priority server 3) with the highest averaged throughput. Incidentally, the averaged throughput of the low priority server 3 is not limited by an average of the throughputs in distribution of two recent fragment data (e.g. the tenth and eleventh fragment data D10 and D11). For instance, the averaged throughput of the low priority server 3 may be calculated by averaging throughputs in distribution of the fragment data in the last connection (e.g. the sixth-tenth fragment data D6-D10) and throughput in distribution of the fragment data in the present connection (e.g. the eleventh fragment data D11). Alternatively, the averaged throughput of the low priority server 3 may be calculated by averaging throughputs in distribution of the recent fragment data (e.g. the eleventh fragment data D11) and a predetermined number of fragment data preceding the recent fragment data. Moreover, the averaged throughput of the high priority server 3 is not limited by an average of the throughputs in distribution of nine recent fragment data (e.g. the twelfth-twentieth fragment data D12-D20). For instance, the averaged throughput of the high priority server 3 may be calculated by averaging throughputs in distribution of the recent fragment data (e.g. the twentieth fragment data D20) and a predetermined number of fragment data preceding the recent fragment data.

Here, in a case where the high priority server 3 is changed between the last (first) connection and the present (second) connection, similar to the above-description, the second acquisition number and the third acquisition number are set again (step S7). Alternatively, in a case where the high priority server 3 is not changed, the player 16 may keep the second acquisition number and the third acquisition number, or may set them on the basis of the rate of the averaged throughputs again.

After that, in a case where the player 16 connects to the plurality of servers 3 for the third time and thereafter (step S8: NO, step S2: NO), the player 16 makes the servers distributes the twenty-first and thereafter fragment data D21-Dn by repeating the similar operation to the above-described second connection. Subsequently, after the player 16 plays back the final n-th fragment data Dn (step S8: YES), the player 16 concludes playback of the content.

Moreover, the player 16 measures latency (a delay amount) in distribution of each fragment data as the network characteristic of each server 3 in addition to the above-described throughput. Subsequently, in a case where the latency of the server 3 (latency of each fragment data or averaged latency of a predetermined number of fragment data) exceeds a predetermined uppermost value, the player 16 lowers using priority of the server 3 below the low priority server 3, for example, decreases the acquisition number of the fragment data in the server 3 in one connection below the third acquisition number, or excepts the server 3 from the distribution source candidate.

Further, the player 16 is configured to receive an internal event issued by the playback device 2. For example, in the playback device 2, the communicating section 12 selects any of various network environments (communicating media), such as a mobile network (a carrier network) of 3G, LTE and others and a Wi-fi network, using environment of the playback device 2, such as the communicating medium, may be changed in accordance with a condition of the user. For instance, when the communicating section 12 automatically selects the communicating medium, if the user having the playback device 2 is moved from the inside of a communication range of the Wi-fi network to the outside, the communicating medium is automatically switched from the Wi-fi network to the mobile network. In a case where changing of the using environment, such as switching of communicating medium, occurs, the playback device 2 issues the internal event. When the player 16 receives the internal event from the playback device 2 in changing of the using environment of the playback device 2 (step S9: YES), the player 16 resets setting of the high priority server 3 and the low priority server 3, and setting of the second acquisition number and the third acquisition number. Subsequently, with respect to the next fragment data, similar to the above-described initial operation, the player 16 makes each server 3 distribute the first acquisition number of the fragment data (step S3, step S4), decides the high priority server 3 and the low priority server 3 again on the basis of the network characteristics, and sets the second acquisition number and the third acquisition number again.

Next, the plurality of servers 3 will be described. Each of the plurality of servers 3 is a content distribution server storing the same contents (fragment data) as the various contents managed in the given center server and distributing the fragment data of the content in accordance with access form the playback device 2.

The server 3 includes, for example, a content distributing section 20 and a content storing section 21. The content storing section 21 stores the contents (fragment data) distributed by the content distributing section 20 in advance. The server 3 may have a function deciding whether or not viewing authority of the content is applied to a predetermined user or a predetermined playback device 2 and authorizing the viewing authority to the user or the playback device 2 on the basis of decision result.

The content distributing section 20 receives the distribution request with indicating the identification information of the fragment data from the playback device 2, acquires the fragment data of the indicated identification information from the content storing section 21, and then, distributes the fragment data to the playback device 2 by a predetermined distributing manner (e.g. streaming or progressive download).

According to the embodiment, as described above, the playback device 2 is a device for receiving the fragment data of the content via the predetermined network 4 to play back the content on the basis of the fragment data in the content distributing system 1. The player 16 of the playback device 2 alternately connects the plurality of servers 3 (distribution sources) distributing the content and receives the predetermined acquisition number of the fragment data continuing in the content from each server 3. The player 16 measures the network characteristics when the fragment data is distributed from the server 3 to the playback device 2. The player 16 compares the respective network characteristics of the plurality of servers 3, selects the server 3 with the best network characteristic as the high priority server 3 (high priority distribution source), decides the server 3 other than the high priority server 3 as the low priority server 3 (low priority distribution source), and increases the second acquisition number from the high priority server 3 above the third acquisition number from the low priority server 3.

The player 16 of the playback device 2 according to the embodiment sets the predetermined magnification of the number of the servers 3 to the decision unit being the number of the fragment data used for deciding the high priority server 3. The player 16 sets the common first acquisition number calculated by dividing the decision unit by the number of the plurality of servers 3 to the acquisition number of the fragment data to be received while being connected to each of the plurality of servers 3 at first time after playback of the content is started. When the player 16 selects the high priority server 3 on the basis of the measurement result of the network characteristics, the player 16 sets the acquisition number of the fragment data from the high priority server 3 to the second acquisition number more than the first acquisition number and sets the acquisition number of the fragment data from the low priority server 3 to the third second acquisition number calculated by subtracting the second acquisition number from the decision unit.

The player 16 of the playback device 2 according to the embodiment calculates the averaged throughput of respective distribution of the predetermined acquisition number of the fragment data as the network characteristic.

In accordance with a configuration described above, in the embodiment, since the player 16 of the playback device measures the network characteristics about the traffic between the playback device 2 and each server 3, it is possible to reduce a load of the center server managing the content. Moreover, since the player 16 measures the network characteristics about the traffic in distribution of the content, it is unnecessary to establish communication only for selection of the optimal server 3 (measurement of the network characteristics), and it is possible to reduce wasteful traffic, to restrain congestion of the network 4 and to restrain decreasing of communication speed. Further, since the player 16 makes not only the high priority server 3 decided the good network characteristic, but also the other low priority server 3, distribute the fragment data of the content, the player 16 always decides the respective network characteristics of the plurality of servers 3. Therefore, since the player 16 immediately selects the optimal high priority server 3 and gives the high priority server 3 priority for distribution of the fragment data, it is possible to restrain decreasing of communication speed. For example, when the user having the playback device 2 is moved, because a base station communicating to the playback device 2 is changed and a communication route to the server 3 is changed, it is expected that the network characteristics are suddenly changed. However, since the player 16 of the embodiment always decides the network characteristic of each server 3 and immediately selects the optimal high priority server 3, it is possible to make the moving user comfortably use the player 16 without feeling changing of the network characteristics (decreasing of the communication speed and others).

Although the embodiment was described as an example of utilizing the plurality of servers 3 storing the same contents as the predetermined center server as the distribution source candidates, the distribution source candidate of the present disclosure is not restricted by the server 3. For instance, in another embodiment, in a case where a CDN (Content Delivery Network) composed of a plurality of servers storing the same contents automatically selects the server with the best network characteristic for the playback device 2, this CDN may be utilized as the distribution source candidate. Alternatively, in a further embodiment, in a case where there are the other external computers, such as the other playback device or the like, capable of distributing the same contents, these may be utilized as the distribution source candidate. Further, in a furthermore embodiment, the server, the CDN and the other computer capable of distributing the same contents may be appropriately combined and utilized as a plurality of distribution source candidates.

Incidentally, the present disclosure may be properly modified without departing from scope and spirit of the disclosure understandable from the claims and the specification, and the playback device and the program (application) making the computer function as the playback device having such modification are included within a technical range of the present disclosure.

The invention claimed is:

1. A playback device comprising a processor configured to receive fragment data of content distributed by streaming via a predetermined network and to control play back of the content in real time on the basis of the fragment data, characterized in that the playback device alternately connects a plurality of distribution sources distributing the content and receives a predetermined acquisition number of the fragment data continuing in the content from each distribution source, measures network characteristics when the fragment data is distributed from the distribution source to the playback device, when presently connecting to the plurality of distribution sources, compares respective network characteristics of the plurality of distribution sources measured in a last connection to the plurality of distribution sources, selects the distribution source with a best network characteristic as the high priority distribution source, decides the distribution source other than the high priority distribution source is a low priority distribution source, sets an acquisition number from the high priority distribution source to be more than an acquisition number from the low priority distribution source by feedback control, and transmits a distribution request of the fragment data of the set acquisition number to the plurality of distribution sources, sets a predetermined magnification of the number of the plurality of distribution sources to a decision unit being the number of the fragment data used for deciding the high priority distribution source, sets a common first acquisition number calculated by dividing the decision unit by the number of the plurality of distribution sources to the acquisition number of the fragment data to be received while being connected to each of the plurality of distribution sources at first time after playback of the content is started, when the high priority distribution source is selected on the basis of measurement result of the network characteristics, sets the acquisition number of the fragment data from the high priority distribution source to a second acquisition number more than the first acquisition number and sets the acquisition number of the fragment data from the low priority distribution source to a third acquisition number calculated by subtracting the second acquisition number from the decision unit, and after the second acquisition number and the third acquisition number are set, when an internal event is issued according to a change of using environment of the playback device, resets setting of the high priority distribution source and the low priority distribution source, and setting of the second acquisition number and the third acquisition number, and then, measures the network characteristic in a next connection to the plurality of distribution sources, and in a connection to the plurality of distribution sources after the next connection, decides the high priority distribution source and the low priority distribution source anew and sets the second acquisition number and the third acquisition number anew.

2. The playback device according to claim 1, wherein the playback device calculates an averaged throughput of respective distribution of the acquisition number of the fragment data as the network characteristic, and sets the second acquisition number on the basis of a rate of the averaged throughput of the high priority distribution source and the averaged throughput of the low priority distribution source so that the second acquisition number is increased as the averaged throughput of the high priority distribution source is increased.

3. A non-transitory computer readable medium storing a program making a computer function as the playback device according to claim 1.

* * * * *